United States Patent
Sher et al.

(10) Patent No.: US 12,442,696 B1
(45) Date of Patent: Oct. 14, 2025

(54) BATTERY MONITORING SYSTEM AND METHOD FOR MONITORING A BATTERY PACK

(71) Applicant: United Arab Emirates University, Al Ain (AE)

(72) Inventors: Zafar Said Nazar Sher, Al Ain (AE); Muhammad Haris Khalid, Dubai (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/086,785

(22) Filed: Mar. 21, 2025

(51) Int. Cl.
*G01K 11/06* (2006.01)
*G01J 5/00* (2022.01)
*H01M 10/48* (2006.01)

(52) U.S. Cl.
CPC ................ *G01K 11/06* (2013.01); *G01J 5/00* (2013.01); *H01M 10/482* (2013.01); *H01M 10/486* (2013.01); *G01J 2005/0077* (2013.01); *H01M 2220/20* (2013.01)

(58) Field of Classification Search
CPC .... G01K 11/06; G01J 5/00; G01J 2005/0077; H01M 10/482; H01M 10/486; H01M 2220/20
See application file for complete search history.

(56) References Cited

U.S. PATENT DOCUMENTS

| | | | |
|---|---|---|---|
| 6,462,551 B1 * | 10/2002 | Coates | B60L 58/10 320/150 |
| 9,658,292 B2 * | 5/2017 | Roumi | G01R 31/64 |
| 2008/0038588 A1 * | 2/2008 | Lee | H01M 50/121 429/72 |
| 2010/0212338 A1 * | 8/2010 | Hermann | H01M 10/486 62/118 |
| 2013/0043375 A1 * | 2/2013 | Baleine | G02F 1/0126 359/240 |
| 2013/0344355 A1 * | 12/2013 | Kozinsky | H02J 7/007194 429/50 |
| 2014/0335382 A1 * | 11/2014 | Balandin | H01M 10/6554 252/73 |

(Continued)

FOREIGN PATENT DOCUMENTS

| | | |
|---|---|---|
| CN | 117895150 | 4/2024 |
| DE | 102014206821 | 10/2015 |

*Primary Examiner* — Laura Martin
*Assistant Examiner* — Philip L Cotey
(74) *Attorney, Agent, or Firm* — Boyle Frederickson, S.C.

(57) ABSTRACT

A battery monitoring system includes a battery pack with a plurality of battery cells, a phase change material, at least one phase change recognition device configured to detect a local phase change of the PCM, and a control unit communicatively coupled to said phase change recognition device. Each battery cell is in contact with the PCM, such that the local phase change occurs in the PCM when the PCM is heated by an adjacent battery cell to or above a phase change temperature of the PCM. The control unit is configured to impart an electrical load on said battery pack, such that functional battery cells heat the PCM locally to or above said phase change temperature, and a respective state of each battery cell may be determined based on a detected presence or absence of local phase change determined by the phase change recognition device.

20 Claims, 3 Drawing Sheets

(56) References Cited

U.S. PATENT DOCUMENTS

| | | | | |
|---|---|---|---|---|
| 2015/0236386 | A1* | 8/2015 | Yang | H01M 10/658 |
| | | | | 165/104.21 |
| 2016/0006088 | A1* | 1/2016 | Boetcher | F28D 20/02 |
| | | | | 165/80.2 |
| 2017/0176118 | A1* | 6/2017 | Patterson | H01L 23/4275 |
| 2018/0080833 | A1* | 3/2018 | Cahan | G01K 11/06 |
| 2018/0183115 | A1* | 6/2018 | Qiu | H01M 10/633 |
| 2018/0195896 | A1* | 7/2018 | Wang | G01J 5/046 |
| 2021/0310975 | A1* | 10/2021 | Moon | G01N 27/403 |
| 2021/0311125 | A1* | 10/2021 | Moon | H01M 10/4285 |
| 2023/0201643 | A1* | 6/2023 | Kim | H01M 50/24 |
| | | | | 169/61 |
| 2023/0324228 | A1* | 10/2023 | Wu | G01J 5/046 |
| | | | | 374/121 |
| 2023/0400361 | A1* | 12/2023 | Mittal | G01K 7/24 |
| 2024/0003752 | A1* | 1/2024 | Odonnell | G01K 11/06 |
| 2024/0038044 | A1* | 2/2024 | Castellarnau | G01N 33/00 |
| 2024/0113361 | A1* | 4/2024 | Pifferi | H01M 10/486 |
| 2024/0429485 | A1* | 12/2024 | Kang | H01M 10/625 |
| 2025/0085242 | A1* | 3/2025 | Zhang | G01N 25/04 |

\* cited by examiner

BATTERY MONITORING SYSTEM AND METHOD FOR MONITORING A BATTERY PACK

TECHNICAL FIELD

The disclosure generally relates to thermal management of batteries. In particular aspects, the disclosure relates to a battery monitoring system and a method for monitoring a battery pack. The disclosure also relates to a vehicle. The disclosure may be applicable to battery systems of transport devices, vehicles, portable electronic devices and many more. Although the disclosure may be described with respect to a vehicle, the disclosure is not restricted to vehicles.

BACKGROUND OF THE INVENTION

Battery packs, particularly those utilizing electrochemical battery cells, are integral components in various applications, including electric vehicles, renewable energy storage systems, and portable electronic devices. As the demand for higher energy density and longer lifespan batteries increases, the complexity of these battery systems also escalates. This complexity introduces significant challenges in the detection and management of faults that may arise within the battery cells or the overall battery pack.

Undetected faults in battery packs can lead to a range of detrimental effects, including reduced performance, safety hazards, and premature failure of the battery system. Common faults may include cell imbalances, internal short circuits, thermal runaway, and degradation of individual cells.

Hence, there is a need for an improved battery monitoring system and a method for monitoring a battery system.

SUMMARY

According to a first aspect of the disclosure, there is provided a battery monitoring system comprising a battery pack with a plurality of battery cells. The battery monitoring system comprises a phase change material having a phase change temperature, wherein each battery cell of the plurality of battery cells is in contact with the PCM, such that a local phase change occurs in the PCM, when the PCM is heated by an adjacent battery cell to or above the phase change temperature. The system also comprises at least one phase change recognition device configured to detect the local phase change of the PCM and a control unit communicatively coupled to the phase change recognition device. The control unit is configured to impart an electrical load on the battery pack, such that functional battery cells of the plurality of battery cells heat the PCM locally to or above the phase change temperature. Further, the control unit is configured to determine a respective state of each battery cell of the plurality of battery cells based on a detected presence or absence of the local phase change detected by the phase change recognition device.

By the first aspect of the disclosure, the battery pack may be efficiently monitored. In particular, malfunctions of the battery pack may be detected efficiently and reliably, by identifying an absence of local phase change, where a local phase change is expected due to the imparted electrical load on the battery pack. Analogously, a malfunction may be detected by identifying a presence of local phase change, where a local phase change is not expected.

A PCM herein may be a material which has a phase change temperature, i.e. a temperature where a phase change occurs, in a range favorable for the specific battery application, such as 45° C.-60° C., and which absorbs sufficient energy at phase transition to provide useful cooling to the battery pack. The PCM may have a latent heat of fusion of at least 100 J/g. The relevant phase change may be from a solid phase to a liquid phase and vice versa, i.e. melting and solidifying. Some PCM may also make use of transitions between different crystalline structures which are at different energy states, wherein the different crystalline structures are solid states. Evaporation of the PCM, i.e. from a liquid phase to a gaseous phase, may also be conceivable.

Such a PCM may efficiently prevent the battery pack from being overheated since it absorbs a considerable amount of heat when reaching the phase change temperature, thereby holding a constant temperature until the PCM is completely melted or transitioned to another solid phase.

Further, the properties of the phase change material may be used to determine a respective state of battery cells by intentionally applying an electrical load on the battery pack which is expected to cause a phase change at the PCM and detecting using the phase change recognition device a local presence or absence of the expected phase change. In some examples, the PCM may be formed as a continuous portion being in contact the battery cells, e.g. the PCM may be wrapped around the battery cells. In other examples, the PCM may comprise a plurality of PCM portions, wherein each portion may be in contact with a single battery cell. Hence, in the latter case, each battery cell is arranged to cause the phase change in the PCM portion it is in contact with.

Optionally, the control unit is further configured to issue an error signal if at least one respective state of a battery cell indicates a malfunction.

The error signal may be issued visually on a display or a user device, and/or audially as a warning alarm or the like. The error signal may also be issued to a battery management system or a control system of a device, e.g. a vehicle, in which the battery pack is installed.

Hence, the malfunction may be notified to an operator or a control system, which can take appropriate counter-measures.

Optionally, the error signal comprises information about the identity and/or position of the at least one respective battery cell.

Thereby, counter-measures, such as replacement of the affected battery cell(s), may be directed to the identified malfunctioning battery cells without the need for further efforts to identify the malfunctioning battery cell(s).

Optionally, the control unit is further configured to deactivate the respective battery cell or the battery pack if at least one respective state of a battery cell indicates a malfunction.

Hence, subsequent malfunctions due to the malfunctioning battery cells may be prevented.

Optionally, the at least one phase change recognition device comprises at least one thermal imaging device arranged to determine a surface temperature field of the PCM.

Thereby, a convenient and reliable indication of the local phase change in the PCM may be obtained.

Optionally, the local phase change of the PCM is determined based on a local surface temperature of the PCM.

A local surface temperature of the PCM, as for example in a sub-portion of the surface temperature field of the PCM, may be indicative of the local phase change, i.e. if the phase change in the sub-portion has occurred or not.

Hence, reliable detection of the presence or absence of the phase change is facilitated.

Optionally, a local surface temperature in the surface temperature field lower than the phase change temperature of the PCM is indicative of a malfunctioning battery cell.

A lower local surface temperature of the PCM, i.e. in a sub-portion of the PCM, may be indicative of the fact that the phase change has not occurred locally, i.e. in said sub-portion of the PCM. Hence, a temperature lower than the phase change temperature may indicate a malfunction in a battery cell adjacent to said sub-region.

Thereby, reliable identification of malfunctioning battery cells is achieved.

Optionally, the detection of the local phase change of the PCM is based on a comparison of the determined surface temperature field with a reference surface temperature field.

For example, a reference surface temperature field may be established when it is known that all battery cells are fully functional.

Hence, a reliable detection of malfunctioning battery cells may be achieved.

Optionally, the detection of the local phase change of the PCM is based on a comparison of a determined temporal behavior of the surface temperature field compared to a reference temporal behavior Thereby, a reliable detection of the local phase change is achieved Optionally, the phase change temperature of the PCM is in the range of 45-60° C.

The choice of a PCM with the phase change temperature below a critical temperature of the battery cells, which may be in a range of 60-90° C., allows for efficient cooling of the battery pack before critical temperatures are reached. The PCM may comprise any one of an organic PCM, such as paraffin wax or fatty acids, or an inorganic PCM, such as hydrated salt or eutectic salt. Also, metallic PCMs are conceivable.

Optionally, the electrical load is an elevated load as compared to a load expected during normal operation, such as during charging of the battery pack.

The electrical load may be chosen to be high enough to cause the phase transition in the PCM. Hence, the functionality of the battery pack may be efficiently tested.

Optionally, the PCM comprises nanoparticles.

Thereby, the PCM may have an appropriate heat conductivity for distributing heat in the PCM.

According to a second aspect of the disclosure, there is provided an electrically driven vehicle comprising the battery monitoring system of the first aspect.

Thereby, an electrically driven vehicle is obtained with improved reliably and safety in respect of the vehicle's battery system.

In a third aspect, there is provided a method for monitoring a battery pack, the battery pack comprising a plurality of battery cells, a PCM having a phase change temperature, at least one phase change recognition device configured to detect the local phase change of the PCM, and a control unit communicatively coupled to the phase change recognition device. Each battery cell of the plurality of battery cells is in contact with the PCM, such that a local phase change occurs in the PCM when the PCM is heated by an adjacent battery cell to or above the phase change temperature. The method comprises:

by the control unit, imparting an electrical load on the battery pack such that functional battery cells of the plurality of battery cells heat the PCM locally to or above the phase change temperature, and by the control unit, determining a respective state of each battery cell of the plurality of battery cells based on a detected presence or absence of the local phase change detected by the phase change recognition device.

The advantages and advantageous features of the method according to the third aspect are largely analogous to the advantages and advantageous features of the system according to the first aspect.

Optionally, the method further comprises:
if at least one respective state of a battery cell indicates a malfunction, issuing an error signal.

Optionally, the error signal comprises information about the identity and/or position of the at least one respective battery cell.

Optionally, the method further comprises:
if at least one respective state of a battery cell, indicates a malfunction, deactivating the respective battery cell and/or the battery pack.

Optionally, the at least one phase change recognition device comprises at least one thermal imaging device arranged to determine a surface temperature field of the PCM.

Optionally, the local phase change of the PCM is determined based on a local surface temperature of the PCM.

Optionally, a local surface temperature in the surface temperature field lower than the phase change temperature of the PCM is indicative of a malfunctioning battery cell.

Optionally, the detection of the local phase change of the PCM is based on a comparison of the determined surface temperature field with a reference surface temperature field.

Optionally, the detection of the local phase change of the PCM is based on a comparison of a determined temporal behavior of the surface temperature field compared to a reference temporal behavior.

Optionally, the phase change temperature of the PCM is in the range of 45-60° C.

Optionally, the electrical load is an elevated load as compared to a load expected during normal operation, such as during charging of the battery pack.

Optionally, the PCM comprises nanoparticles.

BRIEF DESCRIPTION OF THE DRAWINGS

With reference to the appended drawings, below follows a more detailed description of embodiments of the disclosure cited as examples.

In the drawings.

Figure 1:
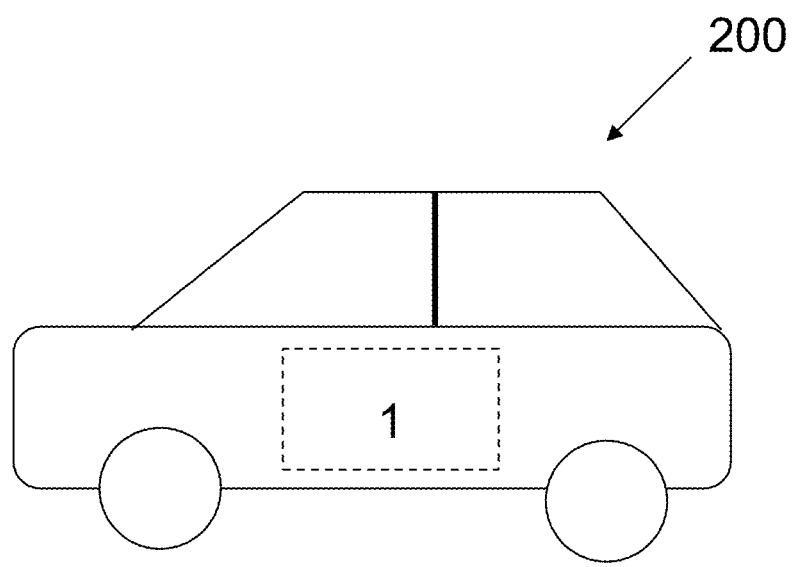
FIG. 1 schematically illustrates a vehicle according to an example.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise. Some of the reference characters in some of the drawings may have been omitted for the sake of clarity.

DETAILED DESCRIPTION OF PREFERRED EMBODIMENTS

The detailed description set forth below provides information and examples of the disclosed technology with sufficient detail to enable those skilled in the art to practice the disclosure.

An aim of the present disclosure is to alleviate at least one drawback of the prior art, or at least to provide a suitable alternative. In particular, an aim of the present disclosure may be to provide a battery monitoring system and a battery monitoring method, which reliably determine respective states of battery cells, e.g. by identifying malfunctioning cells and/or fully functioning cells. Hence, an aim of the present disclosure may be to test battery cells of a battery pack efficiently and reliably. Further, an aim of the present disclosure may be to facilitate the replacement of the malfunctioning battery cells, whereby cost-efficient maintenance and reduced down-times of the battery pack may be achieved.

A battery monitoring system 1 of the present disclosure may be particularly useful for battery systems in electrically driven vehicles. However, it should be noted that the present disclosure applies to batteries in general and is not limited to batteries of vehicular applications. An electrically driven vehicle 200 is schematically illustrated in FIG. 1. The vehicle 200 comprises the battery monitoring system 1.

Figure 2:
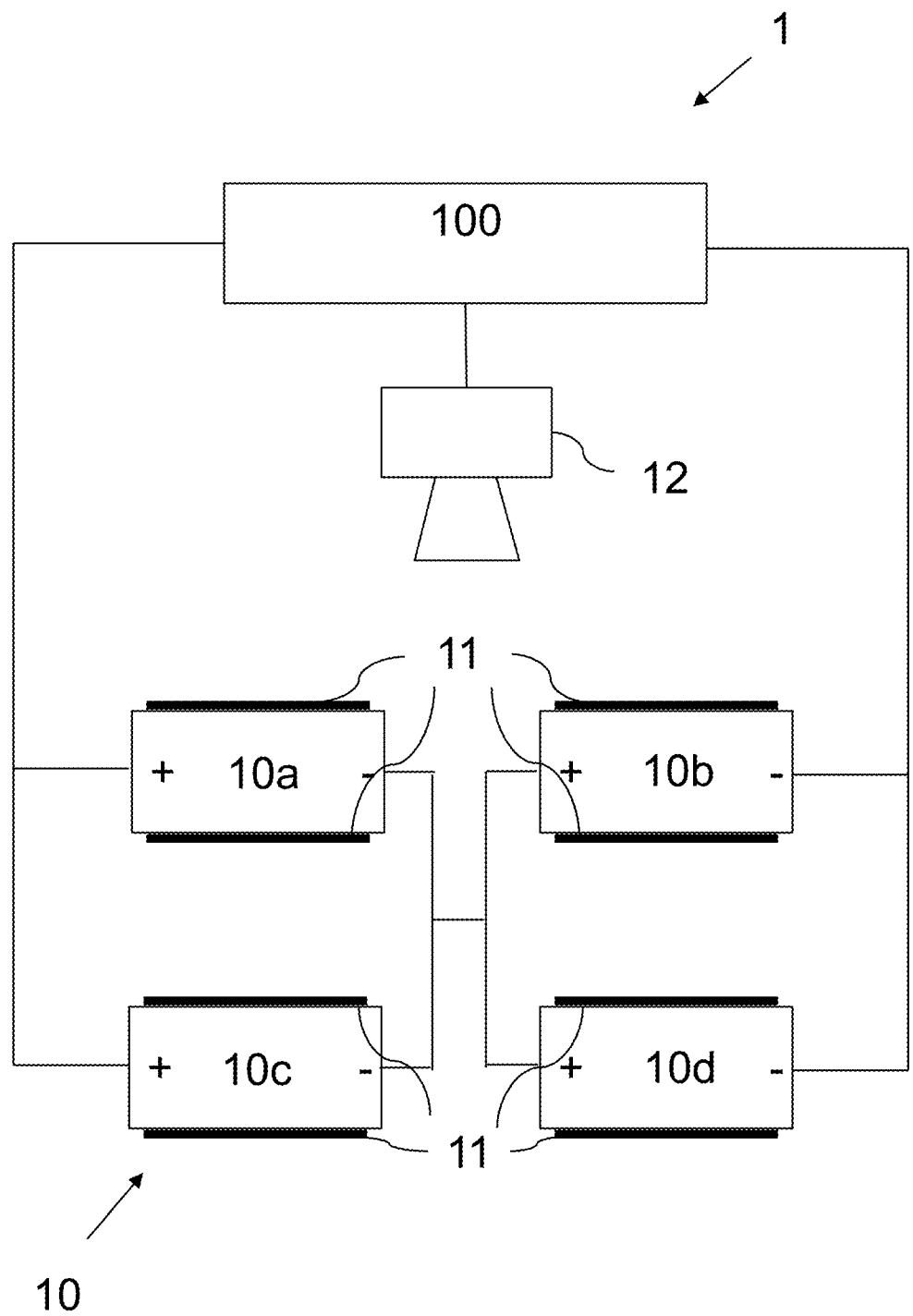
FIG. 2 schematically illustrates a system for battery monitoring according to an example.

FIG. 2 schematically illustrates a battery monitoring system 1 according to an example. The battery monitoring system 1 comprises a battery pack 10 with a plurality of battery cells 10a-10d. The battery pack 10 is here illustrated with four battery cells 10a-10d. However, any other number of battery cells 10a-10d is conceivable. The battery cells 10a-10d may be electrically connected to each other in parallel and/or in series, thereby forming the battery pack 10. The battery pack 10 is connected to a control unit 100. The control unit 100 may be part of a battery management system of a vehicle 200, or any other control system of a device in which the battery pack 10 is installed. The control unit 100 may be able to control the electric load from a power supply (not shown) to the battery pack 10, e.g. during charging, or from the battery pack 10 to a consumer, e.g. during discharging. Further, the system comprises a PCM 11 in connection to the battery cells 10a-10d. The PCM 11 is here illustrated as having a number of portions, each portion being in contact with a respective battery cell. However, the PCM 11 may also be formed as one continuous portion being in contact with the battery cells 10a-10d, e.g. being wrapped around the battery cells 10a-10d. The system also comprises a phase change recognition device 12.

In one example, the phase change recognition device 12 may be at least one thermal imaging device adapted to determine a surface temperature field of the PCM 11. The use of more than one thermal imaging device may be advantageous when parts of the PCM 11 are not visible from one single perspective. The surface temperature field of the PCM 11 determined by the thermal imaging device may comprise the entire outer surface of the PCM 11 or only parts of the surface of the PCM 11. The surface temperature field of the PCM 11 may comprise such portions of the PCM 11 that are indicative of the local PCM temperature adjacent to respective battery cells 10a-10d. Based on the determined surface temperature field of the PCM 11, an indication of the presence or absence of a local phase change of the PCM 11 may be obtained.

In some examples, the phase change recognition device 12 may be adapted to measure local properties of the PCM 11 such as thermal conductivity, electric conductivity or temperature by sensors connected to the PCM 11. These properties may be indicative of a phase change in the PCM 11. Purely as an example, melted PCM 11 may have a higher electrical conductivity compared to solid PCM 11, or vice versa.

Hence, based on measurements and/or determinations by the thermal imaging device and/or other sensors, the phase change recognition device 12 may detect the presence or absence of a local phase change in the PCM 11. In other words, the phase change recognition device 12 may collect information indicative of a local phase change. Based on the collected information, the phase change recognition device 12 or the control unit 100 may determine whether a local phase change has occurred or not. In other words, the decision if the local phase change has occurred may be performed at one of the phase change recognition device 12 or the control unit 100. In some examples, the decision if the local phase change has occurred may be performed collaboratively by both of the phase change recognition device 12 and the control unit 100.

In some examples, the control unit 100 may be configured to impart an electrical load on the battery pack 10. The electrical load may be an elevated load as compared to electrical loads occurring during normal operation of the battery pack 10, e.g. during charging or discharging. Thereby, provided that the battery cells 10a-10d are functional, the local phase change in the PCM 11 may be caused intentionally. Hence, by detecting if the phase change has occurred, non-functional battery cells 10a-10d may easily be discovered.

In some examples, the local phase change may be detected by comparing one or more thermal images from the thermal imaging device to one or more reference thermal images. The reference thermal images may be taken at certain operational states of the battery pack 10, where it is known that under normal conditions, a phase change should have occurred or should not have occurred.

In some examples, the local phase change may be detected based on a comparison of a determined temporal behavior of the surface temperature field compared to a reference temporal behavior. For example, a time-varying electrical load may be imparted on the battery pack 10 under reference conditions and a response in terms of a time-variation of the surface temperature field of the PCM 11 may be recorded. The reference conditions may be conditions where it is known that the battery pack 10 is fully functional. The time-varying load may then be applied to test the battery pack 10. A measured time-variation of the surface temperature field is then compared to the recorded reference time-variation. Deviations may be indicative of malfunctioning battery cells 10a-10d. In particular, the temporal behavior may indicate how fast the phase transitions occur. For example, if the time-varying load is a step function, it may be assessed how fast the PCM responds to the step function with local phase changes, e.g. how fast the PCM melts locally. The response time or the state of the PCM after a predetermined time may then be compared to the reference conditions and malfunctions or other irregularities may be indicated by deviations from the reference time-variation.

Figure 3:
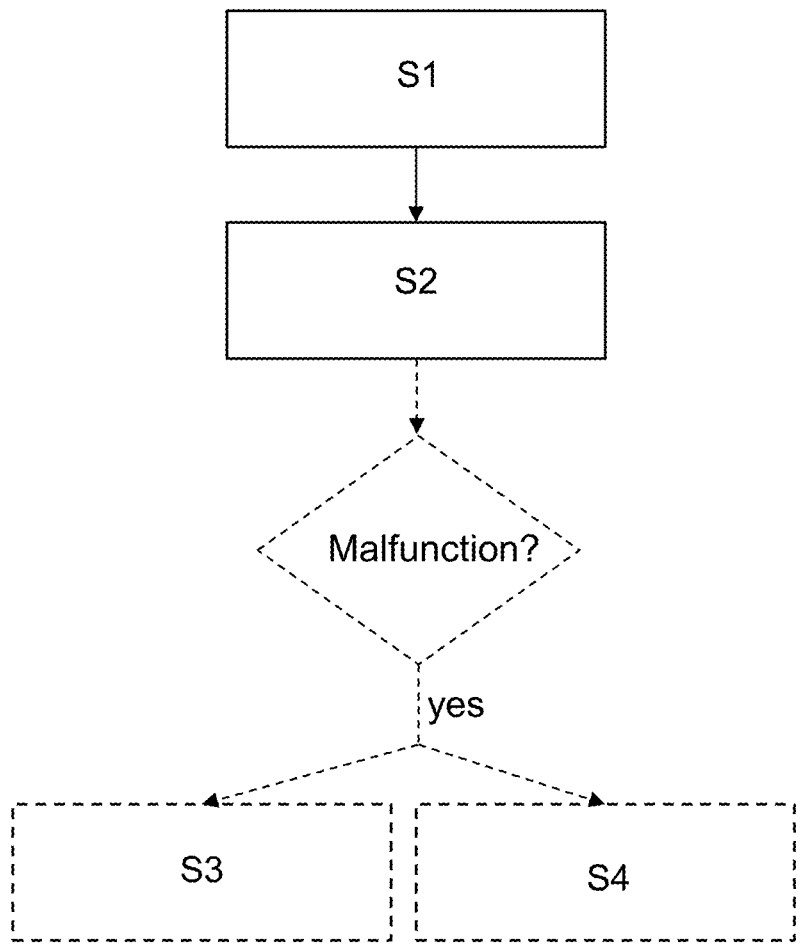
FIG. 3 shows a flow-chart of a method according to an example.

With reference to FIG. 3, a method for monitoring a battery pack 10 is explained. The method may be performed by the system 1 illustrated in FIG. 1, in particular by the control unit 100. The method comprises a number of steps illustrated as a flow-chart. Optional steps are marked by dashed lines.

Step S1: Imparting an electrical load on the battery pack 10, such that functional battery cells 10a-10d of the plurality of battery cells 10a-10d heat the PCM 11 locally to or above the phase change temperature.

As explained above in connection with the battery monitoring system 1, an electrical load is imparted on the battery pack 10, thereby intentionally causing the PCM 11 to be heated up to or above the phase change temperature of the PCM 11. Thereby, the local phase change in the PCM 11 is intentionally induced by functional battery cells 10a-10d. In some examples, the electrical load may be time-varying.

Step S2: Determining a respective state of each battery cell 10a-10d of the plurality of battery cells 10a-10d based on a detected presence or absence of the local phase change detected by the phase change recognition device 12.

The information from the phase change recognition device 12 may be indicative of the presence or absence of a local phase change in the PCM 11. In other words, data of the phase change recognition device 12 may indicate if a phase change has occurred or not. The decision if a local phase change has occurred may be taken by control unit 100 and/or the phase change recognition device 12. Based on this information, the control unit 100 may determine a respective state of each battery cell 10a-10d. The respective state may indicate if the respective battery cell is functional or if there is a malfunction in the respective battery cell.

Step S3: If at least one respective state of a battery cell 10a-10d indicates a malfunction, issuing an error signal.

Information about malfunctions in the battery pack 10 may be communicated to a control system, such as a battery management system, or a vehicle control system if the battery pack 10 is installed on a vehicle 200. The information about malfunctions may also be communicated to an operator, e.g. an operator of the device or the vehicle, on which the battery pack 10 is installed. The information about a malfunction may be in the form of an error signal. A warning and other error information may be displayed on a display of a user device or a screen of a vehicle control system. The error signal may comprise information about the affected battery cell(s) 10a-10d, such as their identity and/or position. This may enable an operator to quickly and easily replace the affected battery cell(s) 10a-10d.

Step S4: If at least one respective state of a battery cell 10a-10d, indicates a malfunction, deactivating the respective battery cell or the battery pack 10.

If a malfunction in the battery pack 10 is indicated, the control unit 100 or another control system or an operator may deactivate the battery pack 10 or the battery cells 10a-10d affected by the malfunction. Thereby, the malfunctioning battery cell(s) may be rendered inoperative and further malfunctions resulting from operating the malfunctioning battery cell(s), such as heat up or thermal runaway, may be avoided.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A battery monitoring system comprising
a battery pack with a plurality of battery cells;
one or more portions, configured in connection with the battery cells, of a phase change material, PCM, having a phase change temperature, wherein each battery cell of the plurality of battery cells is in thermal contact with the PCM, such that a local phase change occurs in the PCM when the PCM is heated by an adjacent battery cell to or above said phase change temperature;
at least one phase change recognition device configured to detect said local phase change of said PCM, and
a control unit communicatively coupled to said phase change recognition device, the control unit configured to
impart an electrical load on said battery pack such that functional battery cells of the plurality of battery cells heat the PCM locally to or above said phase change temperature, and
determine a respective state of each battery cell of the plurality of battery cells based on a detected presence or absence of said local phase change detected by the phase change recognition device in response to the imparted electrical load.

2. The battery monitoring system according to claim 1, wherein said control unit is further configured to:
if at least one respective state of a battery cell indicates a malfunction, issue an error signal.

3. The battery monitoring system according to claim 2, wherein said error signal comprises information about the identity and/or position of said at least one respective battery cell.

4. The battery monitoring system according to claim 1, wherein said control unit is further configured to:
if at least one respective state of a battery cell indicates a malfunction, deactivate the respective battery cell and/or the battery pack.

5. The battery monitoring system according to claim 1, wherein said at least one phase change recognition device comprises at least one thermal imaging device arranged to determine a surface temperature field of the PCM.

6. The battery monitoring system according to claim 5, wherein said local phase change of said PCM is determined based on a local surface temperature of the PCM.

7. The battery monitoring system according to claim 5, wherein a local surface temperature in the surface temperature field lower than the phase change temperature of the PCM is indicative of a malfunctioning battery cell.

8. The battery monitoring system according to claim 5, wherein the detection of said local phase change of said PCM is based on a comparison of the determined surface temperature field with a reference surface temperature field.

9. The battery monitoring system according to claim 5, wherein the detection of said local phase change of said PCM is based on a comparison of a determined temporal behavior of the surface temperature field compared to a reference temporal behavior.

10. The battery monitoring system according to claim 1, wherein the phase change temperature of said PCM is in the range of 45-60° C.

11. The battery monitoring system according to claim 1, wherein said electrical load is an elevated load as compared to a load expected during normal operation, such as during charging of the battery pack.

12. The battery monitoring system according to claim 1, wherein the PCM comprises nanoparticles.

13. An electrically driven vehicle comprising the battery monitoring system of claim 1.

14. A method for monitoring a battery pack, the battery pack comprising
a plurality of battery cells;
one or more portions, configured in connection with the battery cells, of a phase change material, PCM, having a phase change temperature, wherein each battery cell of the plurality of battery cells is in thermal contact with the PCM, such that a local phase change occurs in the PCM when the PCM is heated by an adjacent battery cell to or above said phase change temperature;

at least one phase change recognition device configured to detect said local phase change of said PCM, and a control unit communicatively coupled to said phase change recognition device, the method comprising:

by the control unit, imparting an electrical load on said battery pack such that functional battery cells of the plurality of battery cells heat the PCM locally to or above said phase change temperature, and by the control unit, determining a respective state of each battery cell of the plurality of battery cells based on a detected presence or absence of said local phase change detected by the phase change recognition device in response to the imparted electrical load.

15. The method according to claim 14, further comprising:

if at least one respective state of a battery cell indicates a malfunction, issuing an error signal.

16. The method according to claim 15, wherein said error signal comprises information about the identity and/or position of said at least one respective battery cell.

17. The method according to claim 14, further comprising:

if at least one respective state of a battery cell, indicates a malfunction, deactivating the respective battery cell and/or the battery pack.

18. The method according to claim 14, wherein said at least one phase change recognition device comprises at least one thermal imaging device arranged to determine a surface temperature field of the PCM.

19. The method according to claim 18, wherein said local phase change of said PCM is determined based on a local surface temperature of the PCM.

20. The method according to claim 18, wherein a local surface temperature in the surface temperature field lower than the phase change temperature of the PCM is indicative of a malfunctioning battery cell.

* * * * *